(12) United States Patent
Washburn, II

(10) Patent No.: US 10,905,097 B1
(45) Date of Patent: Feb. 2, 2021

(54) CATTLE GUARD

(71) Applicant: John C. Washburn, II, Kerrville, TX (US)

(72) Inventor: John C. Washburn, II, Kerrville, TX (US)

( * ) Notice: Subject to any disclaimer, the term of this patent is extended or adjusted under 35 U.S.C. 154(b) by 991 days.

(21) Appl. No.: 14/990,663

(22) Filed: Jan. 7, 2016

Related U.S. Application Data

(60) Provisional application No. 62/103,254, filed on Jan. 14, 2015.

(51) Int. Cl.
*A01K 3/00* (2006.01)

(52) U.S. Cl.
CPC .................................. *A01K 3/002* (2013.01)

(58) Field of Classification Search
CPC ...... A01K 3/002; A01K 15/006; A01K 15/04; E04H 2017/1447; E04H 2017/1465; E04H 17/1421; E01B 17/00
USPC ...................................... 256/14, 17; 119/529
See application file for complete search history.

(56) References Cited

U.S. PATENT DOCUMENTS

| | | | | |
|---|---|---|---|---|
| 651,421 A * | 6/1900 | Lawrence et al. | ..... | A01K 3/002 256/17 |
| 1,569,235 A | 1/1926 | Plunkett | | |
| 2,592,225 A * | 4/1952 | Winkler | ................. | A01K 3/002 256/14 |
| 2,618,469 A | 11/1952 | Mayer | | |
| 2,938,711 A * | 5/1960 | Luff | ....................... | A01K 3/002 119/529 |
| 3,289,828 A * | 12/1966 | Dick | .................. | B65D 71/0096 206/597 |
| 3,322,399 A * | 5/1967 | Sawyers | ................ | A01K 3/002 256/17 |
| 3,384,352 A * | 5/1968 | Bruner | .................... | A01K 3/002 256/14 |
| 3,790,135 A * | 2/1974 | Christianson | .......... | A01K 3/002 256/17 |
| 3,971,546 A * | 7/1976 | Bruner | .................... | A01K 3/002 256/14 |
| 4,609,184 A * | 9/1986 | Elkins, Sr. | ........... | A01K 1/0017 16/312 |
| 4,655,435 A | 4/1987 | Joseph, Jr. et al. | | |
| 4,789,137 A | 12/1988 | Heldenbrand | | |
| 5,203,544 A * | 4/1993 | Webb | ..................... | A01K 3/002 119/843 |

(Continued)

OTHER PUBLICATIONS

"Cattle Guards," Web page <http://gobobpipe.com/cattleGuards.htm>, 5 pages, Sep. 20, 2013, retrieved from Internet Archive Wayback Machine <https://web.archive.org/web/20130920115030/http://gobobpipe.com/cattleGuards.htm> on Feb. 15, 2018 (Year: 2013).*

*Primary Examiner* — Matthew R McMahon
(74) *Attorney, Agent, or Firm* — Pizarro Allen PC

(57) ABSTRACT

A cattle guard may include a front rail with at least one receptacle therein, a back rail with at least one receptacle therein, at least one support member having a first end disposed in the at least one receptacle of the front rail and a second end disposed in the at least one receptacle of the back rail, a left rail with a first plurality of receptacles therein, a right rail with a second plurality of receptacles therein, and a plurality of pipes extending between the receptacles of the left and right rails and over the at least one support member. Cattle guard kits and methods of installation are also disclosed.

3 Claims, 5 Drawing Sheets

(56) References Cited

U.S. PATENT DOCUMENTS

| | | | | |
|---|---|---|---|---|
| 5,364,076 A | * | 11/1994 | Nicholls | E04H 17/1421 |
| | | | | 256/22 |
| 5,595,370 A | * | 1/1997 | Heck | A01K 15/04 |
| | | | | 256/14 |
| 6,047,663 A | * | 4/2000 | Moreau | A01K 1/0151 |
| | | | | 119/526 |
| 8,733,741 B2 | * | 5/2014 | Drax | A01K 3/002 |
| | | | | 119/528 |
| 2011/0133144 A1 | | 6/2011 | Miller | |
| 2013/0221305 A1 | | 8/2013 | Dilworth et al. | |

* cited by examiner

CATTLE GUARD

CROSS REFERENCE TO RELATED APPLICATIONS

This application claims priority to U.S. Provisional Patent Application No. 62/103,254 filed Jan. 14, 2015, the disclosure of which is incorporated herein by reference.

BACKGROUND

In the field of farming and ranching, there is a frequent need to provide gates in fences through which vehicles such as trucks and trailers may pass but which prevent passage of cattle and other hooved animals. In the past, cattle guards have been extremely heavy, required skilled labor to weld the various steel components together at an installation site, and required heavy equipment to deliver and install the cattle guard and to excavate a pit to house the cattle guard. Although some applications may warrant such a heavy duty arrangement, many small farms and ranches do not need that level of ruggedness. Additionally, the owners of many small farms and ranches are "do it yourself" people who would like to build their own cattle guards, but they typically do not have the equipment or manpower to build the traditional type of cattle guard. It would be a significant advancement in the art to provide a lightweight cattle guard that is economical to manufacture and ship, simple to assemble and install without skilled labor or a need for specialized equipment, and effective to contain cattle while allowing vehicles to pass through.

SUMMARY

A cattle guard may include a front rail with at least one receptacle therein, a back rail with at least one receptacle therein, at least one support member having a first end disposed in the at least one receptacle of the front rail and a second end disposed in the at least one receptacle of the back rail, a left rail with a first plurality of receptacles therein, a right rail with a second plurality of receptacles therein, and a plurality of pipes extending between the receptacles of the left and right rails and over the at least one support member. In some embodiments, brackets and fasteners may be used to join the rails at corner joints. In some embodiments, a cattle guard as described herein may be provided in kit form.

A cattle guard as described herein may be installed by positioning a front rail and a back rail in spaced relation with each other at a native ground level, with each of the front rail and the back rail having an interior wall with at least one receptacle therein; inserting a first end of a support member in the at least one receptacle of the front rail; inserting a second end of the support member in the at least one receptacle of the back rail; positioning a left rail and a right rail in spaced relation with each other and substantially perpendicular to the front rail and the back rail, the left rail having an interior wall with a first plurality of receptacles therein, and the right rail having an interior wall with a second plurality of receptacles therein; inserting a first end of each of a plurality of pipes in one of the first plurality of receptacles; inserting a second end of each of the plurality of pipes in one of the second plurality of receptacles; wherein each of the plurality of pipes is disposed on top of the support member; joining the front rail to the left rail with a first bracket and fasteners; joining the front rail to the right rail with a second bracket and fasteners; joining the back rail to the left rail with a third bracket and fasteners; joining the back rail to the right rail with a fourth bracket and fasteners; and placing fill material adjacent the front and back rails to form a sloped transition from the native ground level to a top level of the front and back rails.

BRIEF DESCRIPTION OF THE DRAWINGS

Examples of cattle guard assemblies as described herein are shown in the accompanying drawings in which.

DETAILED DESCRIPTION

The following terms as used herein should be understood to have the indicated meanings unless the context requires otherwise.

When an item is introduced by "a" or "an," it should be understood to mean one or more of that item.

"Comprises" means includes but is not limited to.

"Comprising" means including but not limited to.

"Having" means including but not limited to.

As described in detail below, the present application is directed to a cattle guard assembly that is lightweight, inexpensive, and easy to assemble and install without skilled labor or special equipment. Such a cattle guard assembly may be provided in a "kit" form that includes all components needed for assembly by a farmer or rancher with common hand tools, such as wrenches and screwdrivers. The assembly may include a plurality of generally hollow frame components and a plurality of support members and pipes that may be installed into receptacles in the interior walls of the frame components. With the support members and pipes in place, the frame components may be joined together with corner brackets using suitable fasteners, such as bolts and nuts. The cattle guard assembly may be installed on the native ground level, and fill material may be applied about the perimeter of the assembly in order to gradually "ramp up" from the native ground level to the top level of the cattle guard assembly so that vehicles may readily pass over the completed assembly.

Figure 1:
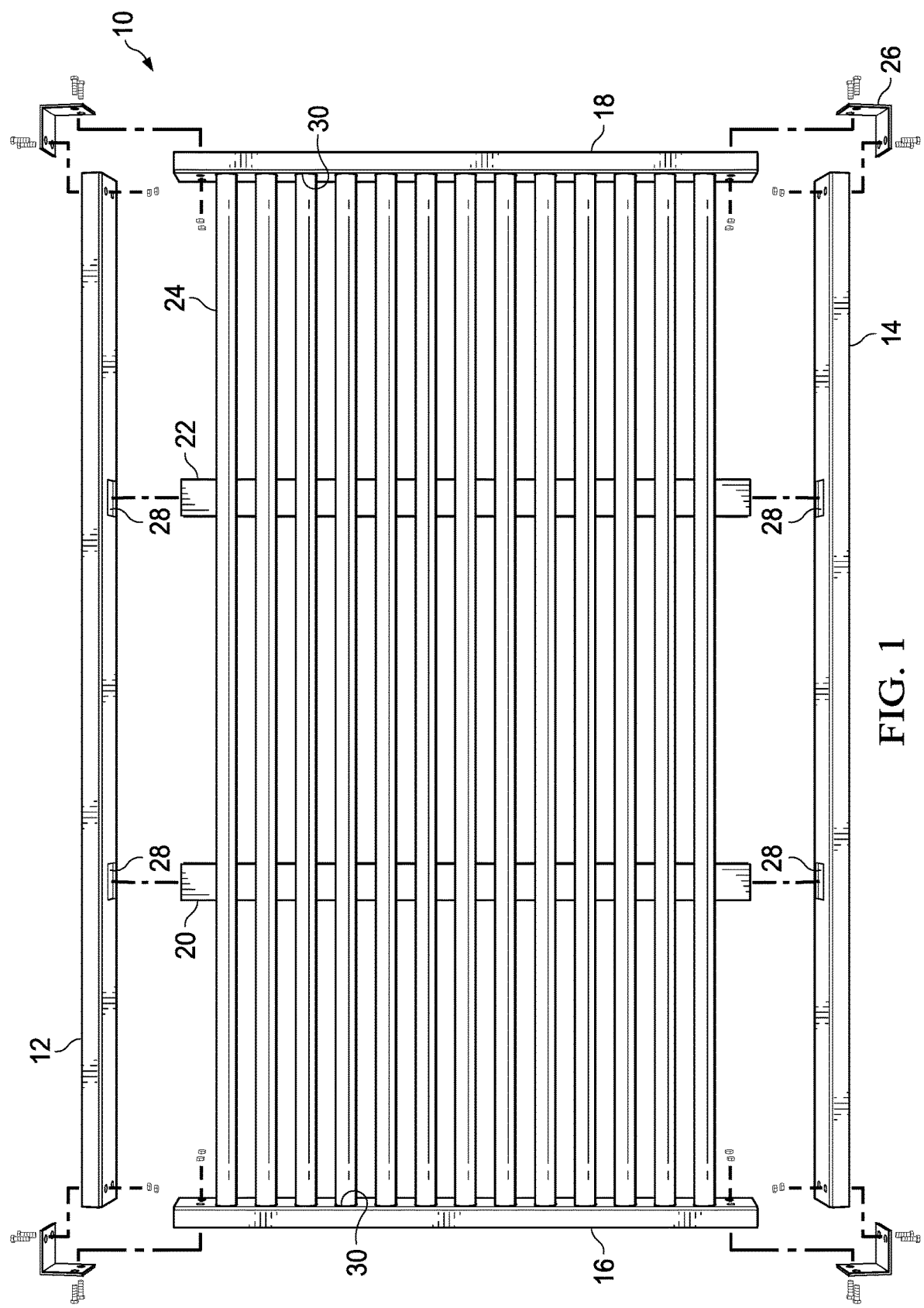
FIG. 1 is a partially exploded top perspective view of a cattle guard.
Figure 2:
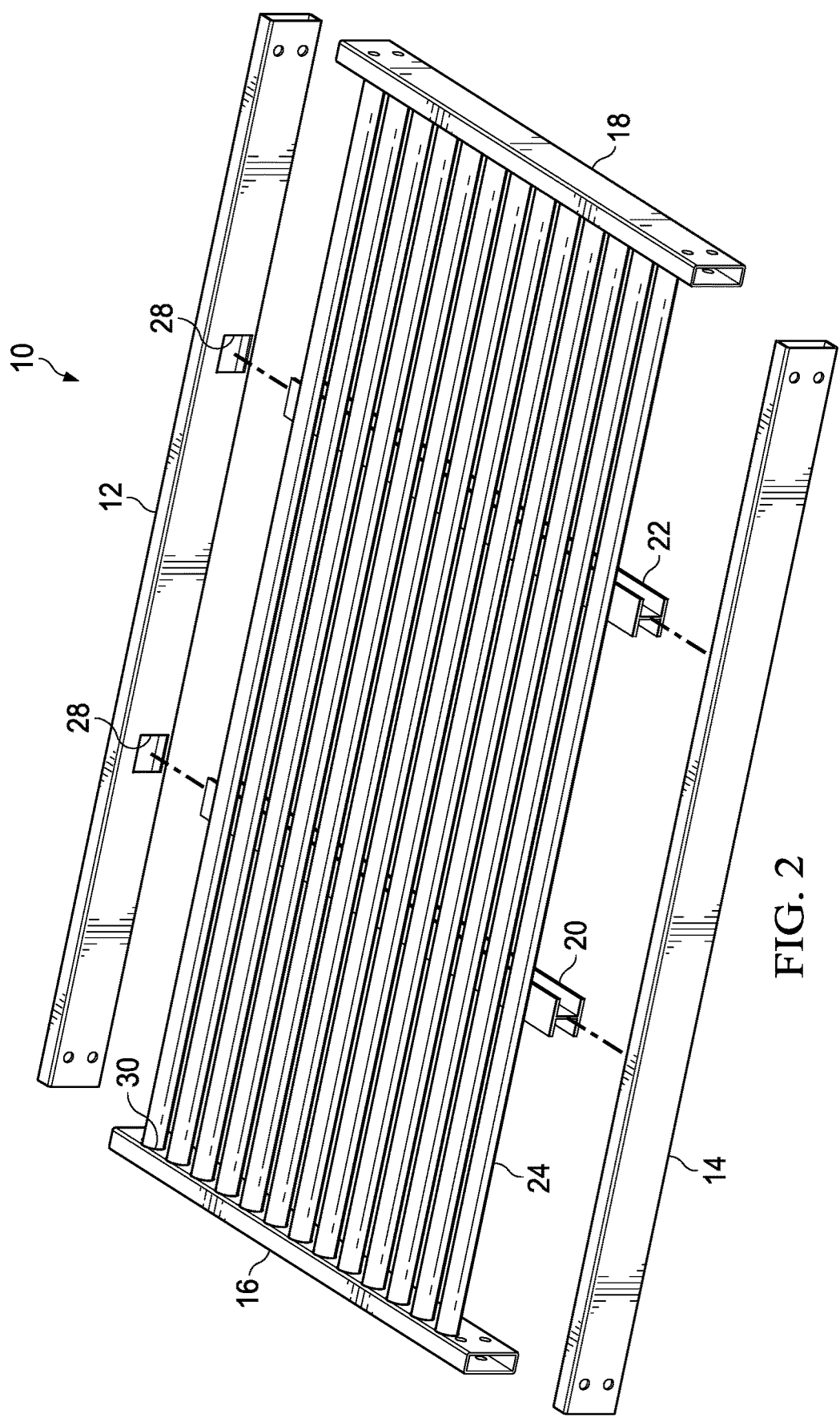
FIG. 2 is another partially exploded top perspective view of the cattle guard of FIG. 1.
Figure 3:
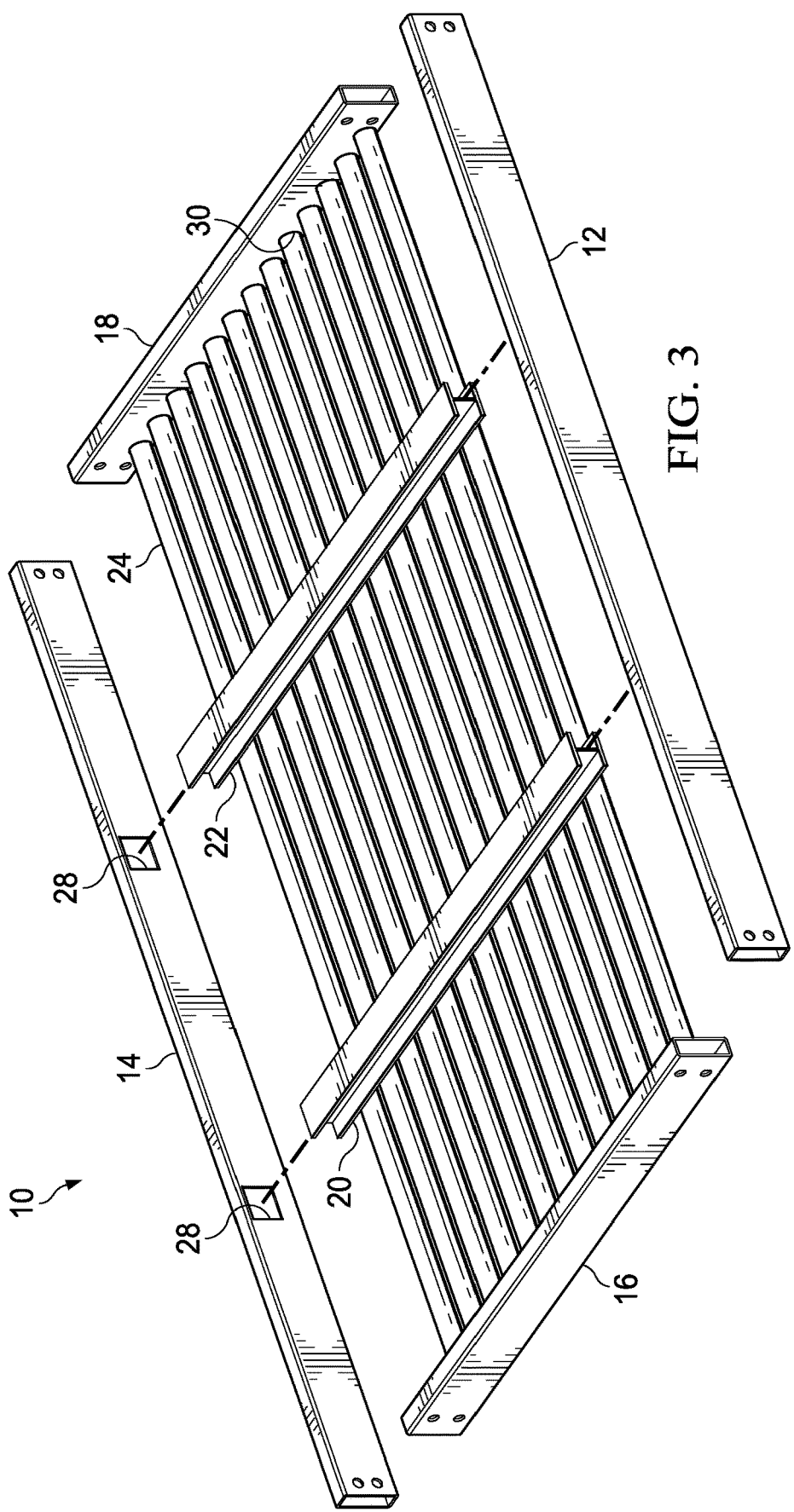
FIG. 3 is a partially exploded bottom perspective view of the cattle guard of FIG. 1.

Referring to FIGS. 1-3, a cattle guard 10 may have a front rail 12, a back rail 14, a left rail 16, and a right rail 18 that may be joined together with four corner brackets 26 using suitable fasteners (e.g., bolts and nuts) to form a frame. Rails 12, 14, 16, 18 and brackets 26 may have pre-drilled fastener holes to receive the fasteners and facilitate easy alignment and assembly. Alternatively, in some embodiments, the ends of rails 12, 14, 16, 18 may be configured with complementary notches, slots, or other suitable fittings such that rails 12 and 14 may slide, snap, or click into engagement with rails 16 and 18, in which case brackets 26 and fasteners may or may not be used. In some embodiments, rails 12, 14, 16, 18 may be made of commercially available metal tubing having a rectangular cross-section, but any suitable materials and cross-sections may be used. The interior walls of rails 12 and 14 may have pre-cut receptacles 28 that are sized and shaped to receive the ends of supports 20 and 22. In some embodiments, supports 20 and 22 may be commercially available metal I-beams, for example, or they may have another suitable material and cross-sectional shape. Cattle guard 10 may be sized such that supports 20 and 22 are located approximately where the wheels of most vehicles may pass over. Of course, any desired number of supports may be used, and such supports may be configured in any suitable spacing. The interior walls of rails 16 and 18 may have pre-cut receptacles 30 that are sized and shaped to receive the ends of a plurality of pipes 24. In some embodiments, pipes 24 may be made of commercially available metal tubing having a circular cross-section, but any suitable materials and cross-sections may be used. Supports 20 and 22 and pipes 24 may be placed into their respective receptacles of rails 12, 14, 16, 18 as such rails are assembled together to form the frame. Once the supports 20, 22 and pipes 24 are in place in the rails 12, 14, 16, 18, the brackets 26 may be installed. When assembled as described, the supports 20, 22 and pipes 24 may be held securely in place within the rails 12, 14, 16, 18. In some embodiments, cattle guard 10 may have no fasteners other than the fasteners, if any, used to install the corner brackets 26.

The wall thicknesses, cross-sectional shapes, and lengths of rails 12, 14, 16, 18 and supports 20, 22 and pipes 24 may be sized and made of selected materials so as to provide sufficient strength and service life for cattle guard 10, depending on the desired application. For example, in some embodiments designed for light duty use, a cattle guard 10 measuring approximately 12 by 7 feet may have rails 12, 14, 16, 18 made of rectangular structural steel tubing of about $3/16$" to $1/4$" wall thickness and typically about 2-3 inches wide by about 8-10 inches tall and about 12 feet long; pipes 24 may be made of $2\frac{7}{8}$ inch diameter steel pipe having a wall thickness of about 0.203" and a length of about 11.5 feet; and supports 20, 22 may be made of steel I-beams having a width of about 6-8", a depth of about 6", a web and flange thickness of about 0.23-0.32", and a length of about 6.5 feet. This arrangement would typically be capable of supporting light to medium duty trucks and stock, horse and utility trailers with single axle weight ratings up to about 20,000 lbs. The approximate weight of this cattle guard configuration may be about 1,400-1,600 lbs. Alternatively, in some embodiments designed for medium duty use, a cattle guard 10 measuring approximately 14 by 7 feet may have rails 12, 14, 16, 18 made of rectangular structural steel tubing of about $1/4$" to $3/8$" wall thickness and typically about 2-3 inches wide by about 10-12 inches tall and about 14 feet long; pipes 24 may be made of $2\frac{7}{8}$ inch diameter steel pipe having a wall thickness of about 0.203" and a length of about 13.5 feet; and supports 20, 22 may be made of steel I-beams having a width of about 6-8", a depth of about 6", a web and flange thickness of about 0.26-0.32", and a length of about 6.5 feet. This arrangement would typically be capable of supporting medium to heavy duty trucks and stock, horse, utility, construction, and freight trailers with tandem axle weight ratings up to about 34,000 lbs. The approximate weight of this cattle guard configuration may be about 1,800-2,200 lbs. Alternatively, in some embodiments designed for heavy duty use, a cattle guard 10 measuring approximately 16 by 8 feet may have rails 12, 14, 16, 18 made of rectangular structural steel tubing of about $1/2$" to $3/4$" wall thickness and typically about 3-4 inches wide by about 12-14 inches tall and about 16 feet long; pipes 24 may be made of $3\frac{1}{2}$ inch diameter steel pipe having a wall thickness of about 0.226" and a length of about 15.5 feet; and supports 20, 22 may be made of steel I-beams having a width of about 6-8", a depth of about 8", a web and flange thickness of about 0.24-0.46", and a length of about 7.5 feet. This arrangement would typically be capable of supporting heavy duty trucks and stock, construction, and freight trailers with triple axle weight ratings up to about 42,000 lbs. The approximate weight of this cattle guard configuration may be about 2,400 to 3,000 lbs. In some embodiments, cattle guard 10 may be sized to be of a sufficiently low weight that one or two people may assemble it on site without any need for a welder or any other special equipment. Of course, the foregoing are simply examples, and the various components of cattle guard 10 may be structurally engineered to meet any desired weight ratings and service levels.

In some embodiments, the components of cattle guard 10 may be provided in the form of a kit. In kit form, the cattle guard components—e.g., rectangular tubing frame members (rails 12, 14, 16, 18), I-beams (supports 20, 22), pipes 24, corner brackets 26 & hardware—may be laid alongside each other lengthwise and bound with metal strapping multiple times along the entire length to form a compact package of approximately 18 inches by 18 inches by 12' to 14' to allow for handling and stacking with a typical forklift and/or other shipping company materials handling equipment.

Figure 4:
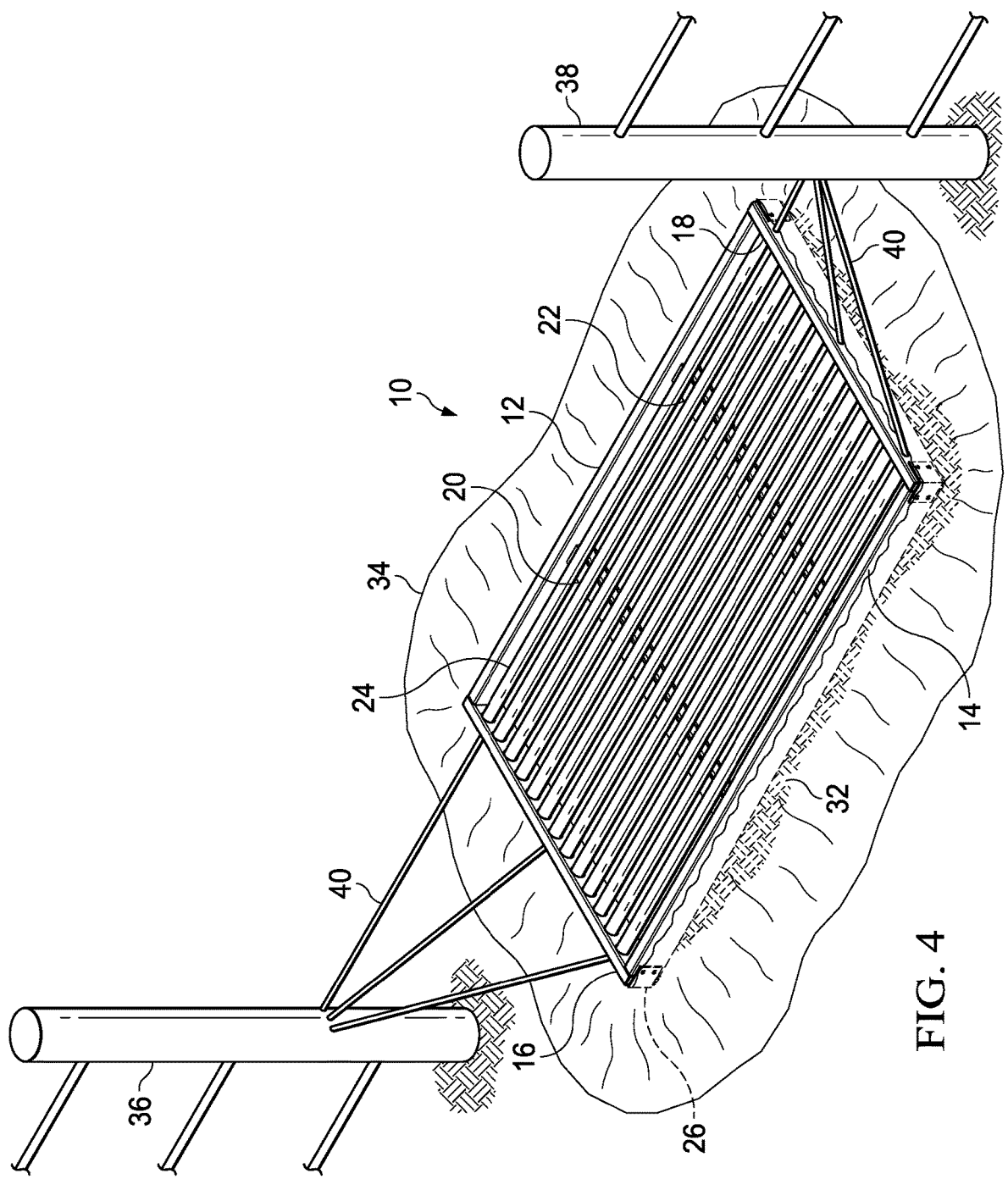
FIG. 4 is a perspective view of the cattle guard of FIG. 1 shown in an installed position.

Referring to FIG. 4, cattle guard 10 may be installed in a gap of a fence between fence posts 36 and 38 as shown. In some embodiments, one or more barrier members 40, such as cables or rods, for example, may be connected between cattle guard 10 and fence posts 36, 38 with suitable attachments (e.g., hooks, eyelets, hasps, or the like) to prevent cattle or other hooved animals from passing between cattle guard 10 and the fence posts 36, 38. In some embodiments, rather than digging a pit, cattle guard 10 may be placed on native ground level 32, and fill material 34, such as dirt or crushed stone, for example, may be applied about the perimeter of cattle guard 10 in order to gradually "ramp up" from the native ground level to the top level of cattle guard 10 so that vehicles may readily pass over it. Of course, if desired, a pit may be provided such that the top level of cattle guard 10 is substantially flush with the native ground level 32 when installed.

Figure 5:
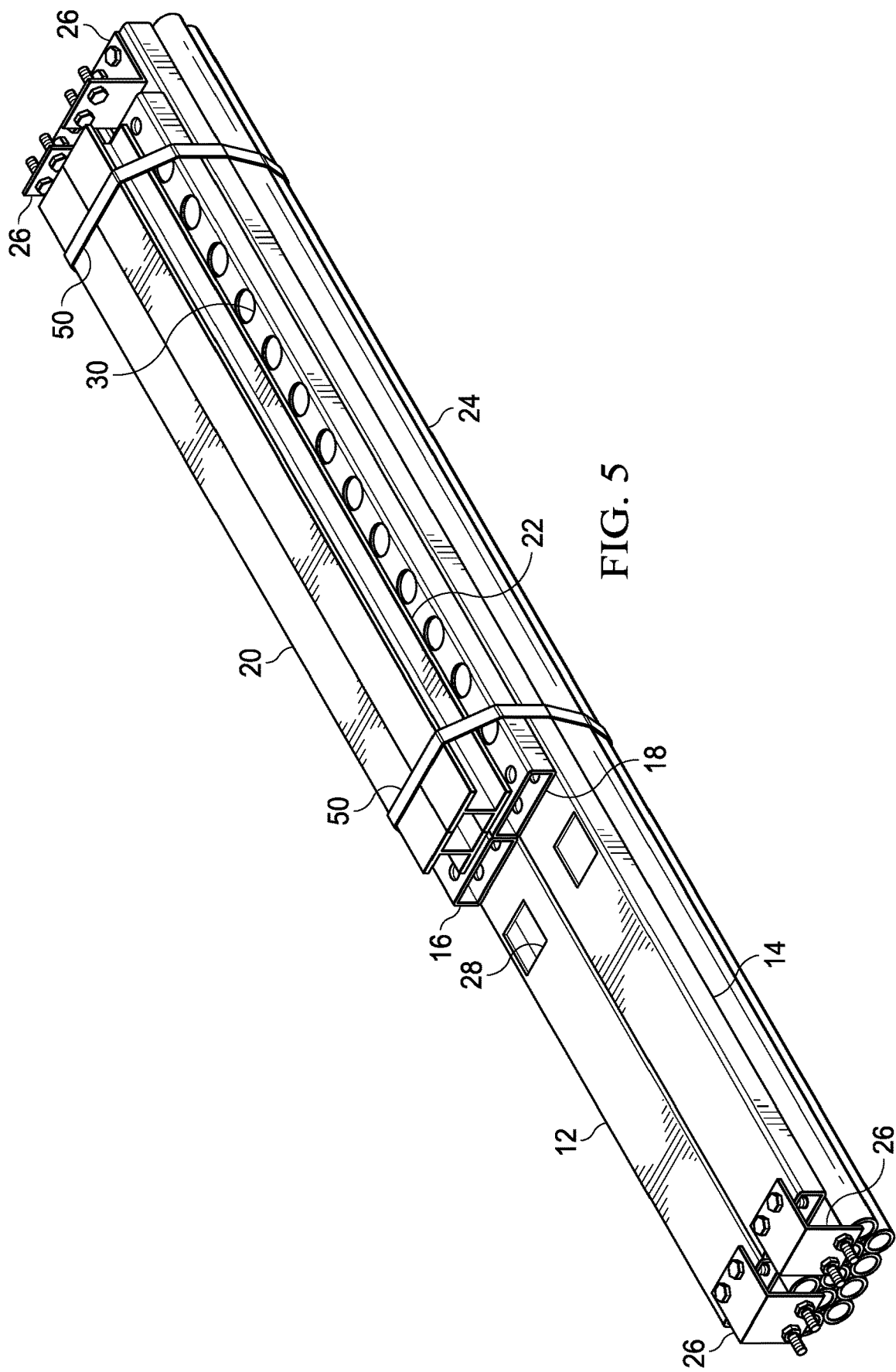
FIG. 5 is a perspective view of a cattle guard kit.

Referring to FIG. 5, a cattle guard kit is shown in which a plurality of I-beam supports 20, 22, a plurality of pipes 24, and a plurality of rectangular tubing frame members 12, 14, 16, 18 are disposed alongside each other lengthwise and bound with a plurality of metal straps 50 along the length thereof to form a compact package. As shown, the kit may include a plurality of corner brackets 26 and fasteners configured for attaching the frame members to each other. At least two of the frame members 12, 14 may include receptacles 28 configured for receiving the plurality of supports 20, 22, and at least two of the frame members 16, 18 may include receptacles 30 configured for receiving the plurality of pipes 24. Thus, the kit may be readily assembled into the form of cattle guard illustrated in FIGS. 1-4.

The embodiments described herein are some examples of the current invention. Various modifications and changes of the current invention will be apparent to persons of ordinary skill in the art. Among other things, any feature described for one embodiment may be used in any other embodiment. Terms such as "first" and "second" are used to distinguish certain items and should not be construed to require a certain order or level of importance unless specifically so stated. Similarly, terms such as "left" and "right," "front" and "rear," and "upper" and "lower" are used to distinguish certain items and should not be construed to require a certain orientation unless specifically so stated. The scope of the invention is defined by the attached claims and other claims to be drawn to this invention, considering the doctrine of equivalents, and is not limited to the specific examples described herein.

What is claimed is:

1. A cattle guard comprising:
 a front rail having an interior wall with at least one receptacle therein;
 a back rail having an interior wall with at least one receptacle therein;
 said front rail and said back rail being spaced apart from one another;
 at least one support member having a first end disposed in said at least one receptacle of said front rail and a second end disposed in said at least one receptacle of said back rail;
 a left rail having an interior wall with a first plurality of receptacles therein;
 a right rail having an interior wall with a second plurality of receptacles therein;
 said left rail and said right rail being spaced apart from one another; and
 a plurality of pipes, each of said plurality of pipes having a first end disposed in one of said first plurality of receptacles and a second end disposed in one of said second plurality of receptacles, and each of said plurality of pipes being disposed on top of said at least one support member.

2. The cattle guard of claim 1 further comprising a plurality of brackets and fasteners connecting said front, back, left, and right rails.

3. A cattle guard consisting essentially of:
 a front rail having an interior wall with at least one receptacle therein;
 a back rail having an interior wall with at least one receptacle therein;
 said front rail and said back rail being spaced apart from one another;
 at least one support member having a first end disposed in said at least one receptacle of said front rail and a second end disposed in said at least one receptacle of said back rail;
 a left rail having an interior wall with a first plurality of receptacles therein;
 a right rail having an interior wall with a second plurality of receptacles therein;
 said left rail and said right rail being spaced apart from one another; and
 a plurality of pipes, each of said plurality of pipes having a first end disposed in one of said first plurality of receptacles and a second end disposed in one of said second plurality of receptacles, and each of said plurality of pipes being disposed on top of said at least one support member.

* * * * *